Oct. 29, 1963     C. P. KUEBLER     3,108,381
LAYOUT DEVICE

Filed March 22, 1960     3 Sheets-Sheet 1

INVENTOR.
CARL P. KUEBLER
BY Bauer and Seymour
ATTORNEYS

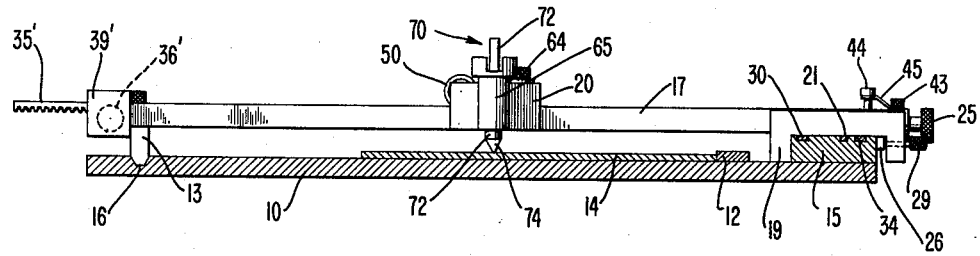
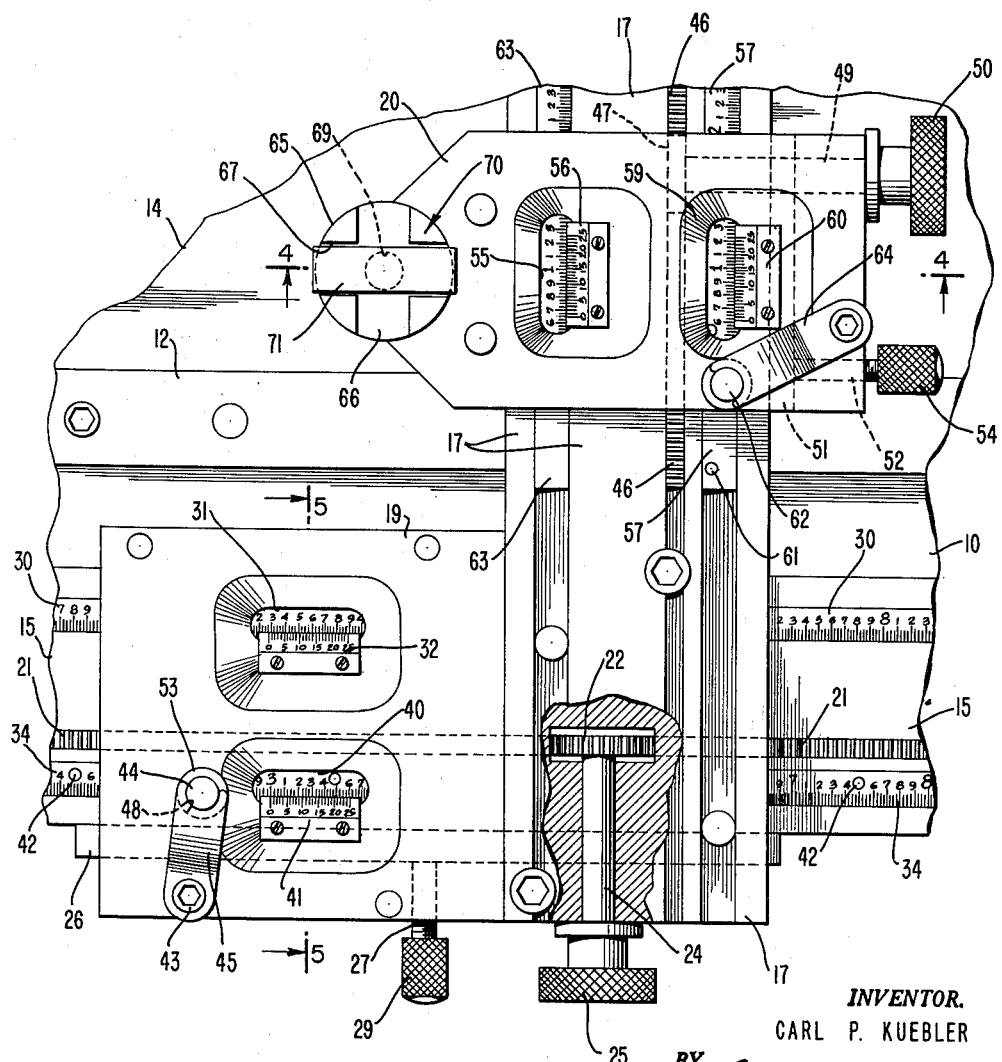
INVENTOR.
CARL P. KUEBLER
BY Bauer and Seymour
ATTORNEYS

Oct. 29, 1963 C. P. KUEBLER 3,108,381
LAYOUT DEVICE
Filed March 22, 1960 3 Sheets-Sheet 3
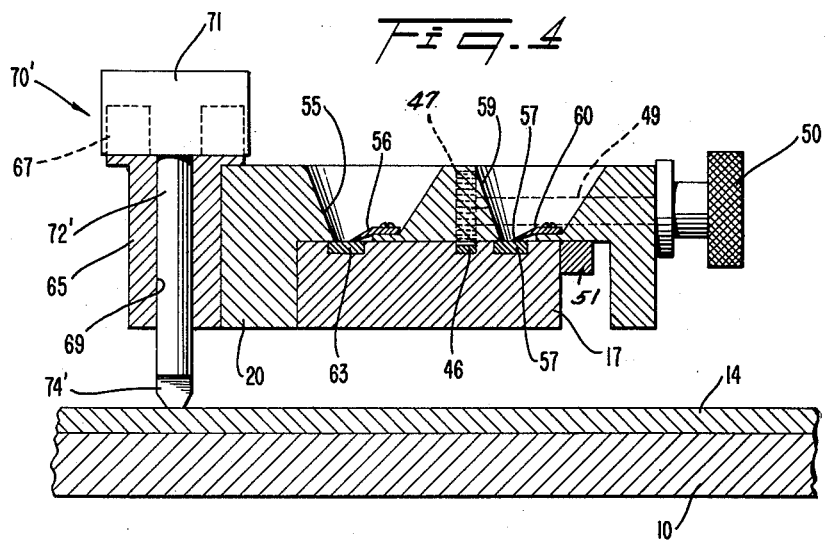
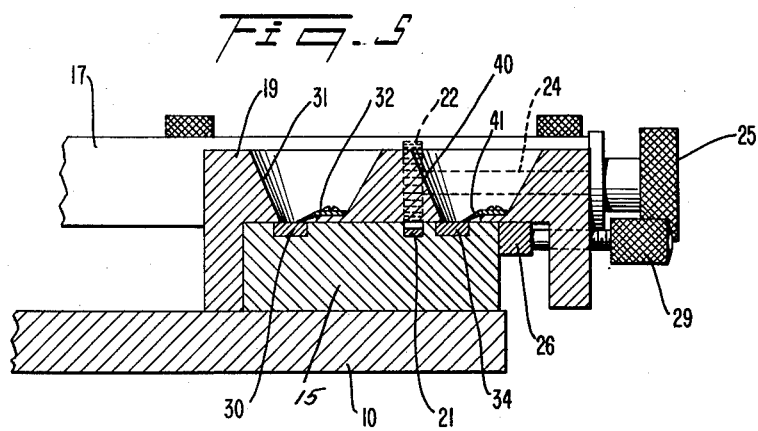
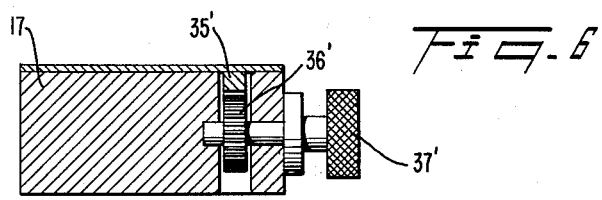
INVENTOR.
CARL P. KUEBLER
BY Bauer and Seymour
ATTORNEYS

United States Patent Office 3,108,381
Patented Oct. 29, 1963

3,108,381
LAYOUT DEVICE
Carl P. Kuebler, Sidney, N.Y., assignor to The Bendix Corporation, a corporation of Delaware
Filed Mar. 22, 1960, Ser. No. 16,833
4 Claims. (Cl. 33—32)

This invention relates to a layout device for sheet or plate workpieces. A particular use in which the device of the invention is particularly advantageous is in the accurate spotting and marking of holes, grooves, and the like to be made in a broad sheet or plate such as the base plate for a die or template. Typical of such dies and templates are those for working upon sheet metal wherein upstanding punches and the like are mounted upon a broad base for the die.

Heretofore, in laying out a workpiece such as a template or a die, the toolmaker took a square piece of stock, clamped the stock against an angle plate, and laid out the parts given on the drawing. Frequently, in establishing one or more points, the part to be laid out had to be turned 90 degrees. This manner of laying out parts such as dies and templates is very time-consuming, and frequently leads to error, since the toolmaker may neglect to turn the drawing in the same manner that he has turned the workpiece.

Further, the working drawings for dies and templates frequently locate only the first one or two points with reference to the edges or base lines of the workpiece, succeeding points being located only by reference to the first one or two points. This makes it necessary, in locating the latter points, to add or subtract the dimensions given for such succeeding points from those of previous points. This is a source of frequent error in the making of templates or dies.

It is among the objects of the present invention to provide a novel simple layout device which eliminates the necessity for turning the workpiece in locating and scribing various required points upon such workpiece.

A further object of the invention lies in the provision of a layout device or board which eliminates the necessity for adding or subtracting any but the integer portions of the dimensions of various ones of the points in locating further points, even though such further points may be located on the working drawing only by reference to one or more previous points.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in plan of a preferred embodiment of layout device in accordance with the invention, the device being shown in an intermediate stage of its manipulation in the laying out of the points A, B, C, and D on the workpiece;

FIG. 2 is a view in vertical section through the layout device and workpiece shown in FIG. 1, the section being taken generally along the line 2—2 of FIG. 1;

FIG. 3 is an enlarged fragmentary view in plan of the layout device of FIG. 1, the device being shown adjusted so that the two carriages thereof lie relatively close to each other;

FIG. 4 is a view in section through the second carriage of the device, the section being taken along the line 4—4 of FIG. 3;

FIG. 5 is a view in section through the first carriage of the device, the view being taken along the line 5—5 of FIG. 3; and FIG. 6 is a fragmentary view in section of the means for adjusting a second auxiliary scale of the device, the section being taken along the line 6—6 of FIG. 1.

Figure 1:
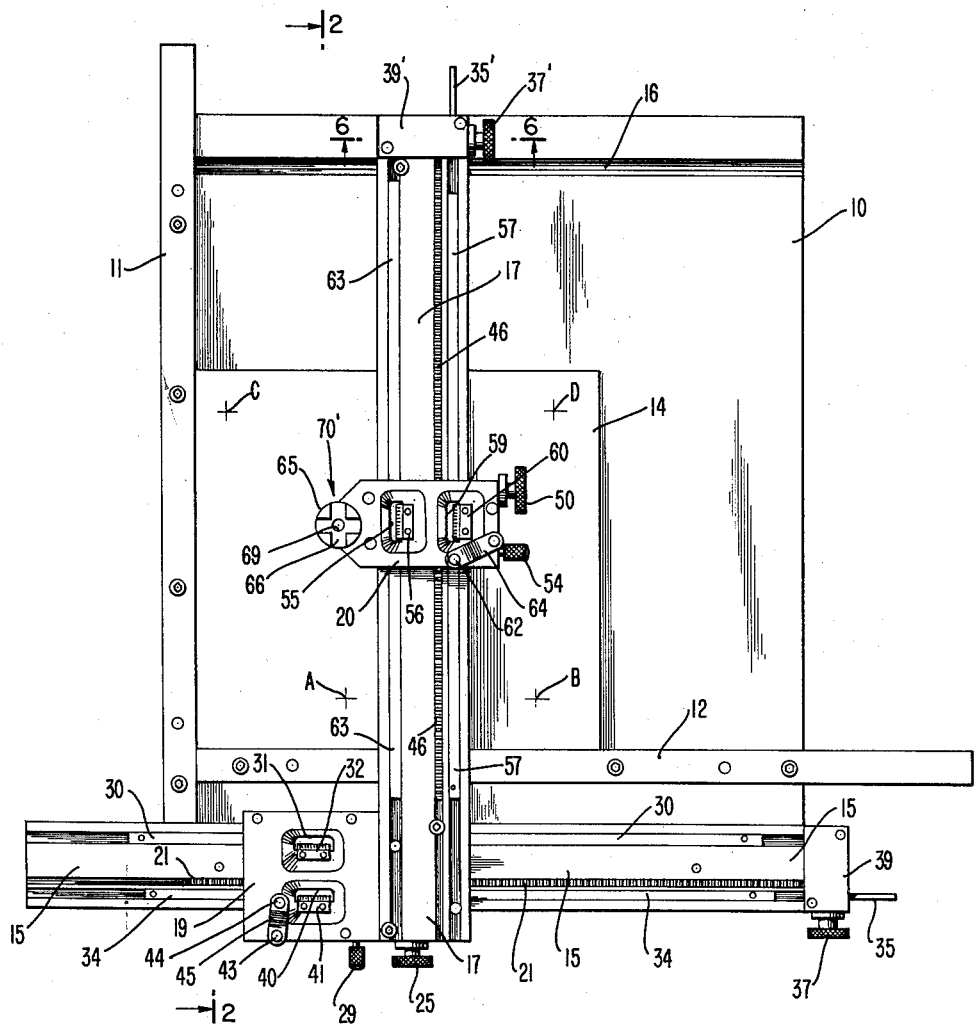

The preferred embodiment of layout device of the invention has a broad plate-like base 10 of rectangular shape, there being two upstanding edge guides 11 and 12 disposed at 90° with respect to each other along adjacent sides of the base plate 10 and fixed with respect to such base. A workpiece 14, which we will assume is a metal plate which is to form the base of a sheet metal working die, is a square shape; workpiece 14 is positioned as shown with two side edges thereof accurately engaging guides 11 and 12. Workpiece 11 is shown as having four points A, B, C, D thereon; operation of the device will be described hereinbelow in the operations involved in the location of such points.

Fixedly attached to base 10 is a rail or guide member 15. Adjacent the other end of board 10 there is a groove forming a second rail or track 16 which lies parallel to rail 15. An adjustable rail or guide 17 is movable along rails 15 and 16 so that the rail 17 may be traversed across the full width of the base 10. A slide 13 at the upper end of rail 17 as it is shown in FIG. 1 fits within track 16 as shown in FIG. 2.

Accurately guided upon rail 15 is a first carriage 19 which is attached to the lower end of movable rail 17 as shown in FIGS. 1 and 3. A second carriage 20 is accurately guided for movement along the rail 17 so that such second carriage may traverse the full height of the piece 10 as it is shown in FIG. 1. Carriage 19, and thus rail 17, are moved along rail 15 by mechanism including a fixed rack gear 21 extending along rail 15, and a pinion 22 fixed to a stub shaft 24 journalled in carriage 19. A knob 25 on the outer end of shaft 24 may be turned to cause pinion 22, and thus carriage 19, to travel along the rack.

Carriage 19 and rail 17 may be locked in a desired adjusted position by locking means including a locking bar 26 which may selectively be thrust against the outer edge of rail 15 by a screw 27 threaded into the outer side flange of carriage 19. A knob 29 on screw 27 allows the locking bar 26 readily to be thrust into locking position or unlocked, as desired.

A first fixed scale 30 is secured to rail 15 as shown in FIG. 3. As there shown, such scale is divided in inches, tenths of inches, and so forth. A first window or aperture 31 is provided in carriage 19 so as to expose a portion of scale 30. Affixed to carriage 19 at window 31 is a scale 32 which is provided with a zero and with a vernier scale, as shown. Scales 30 and 32 are employed to position the scribing guide (to be described) at given distances from the inner edge of the fixed edge guide 11.

Also located on rail 15 is a second scale 34 which is divided similarly to scale 30. Scale 34, however, is mounted for limited reciprocation on rail 15 in a direction parallel to the longitudinal axis of such rail and to scale 30. Scale 34 is provided on its right hand end, as it is shown in FIG. 1, with an extension 35 having a rack gear on its lower side, such rack gear meshing with a pinion (not shown) which is secured to a shaft journalled in an enlargement 39 affixed to the right hand end of rail 15. The shaft mounting the pinion may be turned in either direction by a knob 37 on the shaft, whereby to slide scale 34 along rail 15. The scale 34 accurately fits within a guideway in rail 15, and the frictional engagement therebetween in addition to the friction between the rack gear and pinion are such that scale 34 remains stably in position longitudinally of rail 15 until it is deliberately adjusted by turning knob 37.

A window 40 is provided in carriage 19 so as to expose a portion of scale 34. At such window there is provided a short scale 44 affixed to carriage 19, scale 41 providing indicia furnishing a zero point and a vernier scale. Scale 34 is provided with a plurality of equally spaced upwardly open recesses 42 for cooperation with a selectively operated stop means on carriage 19 so that scale 34 may be accurately located with respect thereto. In the embodiment shown, recesses or holes 42 are so located as to locate successive inch marks on the scale 34 in alignment with the zero point of vernier scale 41.

The stop means is in the form of a plunger 44 which accurately fits within a vertical bore in carriage 19 and is constantly urged in an upward direction so as to clear scale 34 by means of a relatively stiff leaf spring 45. As shown in FIG. 2, spring 45 is secured at one end to carriage 19 by a stud 43, the spring being bent upwardly from its point of attachment to the carriage so as to lie markedly spaced therefrom at the plunger 44. Such upper end of the spring is arcuately notched as shown at 48 so that it lies partially about the stem of the plunger and beneath the enlarged head 53 thereon. The holes or recesses 42 in scale 34 are preferably frusto-conical in shape, and the lower end of plunger 44 has a frusto-conical shape complementary thereto so that the plunger accurately positions the scale when the plunger is depressed after the scale 34 has been adjusted so that a recess of the scale are generally in alignment with the plunger.

The carriage 20 on rail 17 is moved, preliminarily positioned, and accurately located in substantially the same manner as carriage 19. Thus a longitudinally-extending rack gear 46 is affixed to rail 17, and carriage 20 has a pinion 47 affixed to a shaft 49 journalled in carriage 20. Carriage 20 may be traversed along rail 17 by turning shaft 49 through the medium of a knob 50 affixed to the outer end of such shaft. Carriage 20 is provided with a locking strip or block 51 which is selectively thrust into locking engagement with the outer edge of rail 17 by a locking screw 52 which may be turned by a knob 54.

Rail 17 is provided with a fixed scale 63 which is divided in the same manner as scale 30. A window 55 is provided in carriage 20 so as to overlie and expose a portion of scale 63. The carriage is provided with a short scale 56 at window 55, such short scale being provided with a zero mark and with a vernier scale cooperating with scale 63.

Rail 17 is provided with a movable scale 57 which is moved longitudinally of the rail by means of an extension 35′ having a rack gear on the lower edge thereof, such rack gear meshing with a pinion 36′ journalled in a housing 39′ secured to the upper end of rail 17 as it is shown in FIG. 1. Scale 57 may be moved by turning a knob 37′ affixed to an end of the shaft mounting pinion 36′, as shown. Scale 57 is provided with a plurality of holes or recesses 61 which are uniformly spaced, in this instance at intervals of one inch. Holes 61 cooperate with the inner end of a stop plunger 62, which is similar to the above-described plunger 44 and is mounted for reciprocation in a bore in carriage 20. Plunger 62 is normally held elevated from engagement with scale 57 by means of a bent leaf spring 64, similar to spring 45, which is secured at its outer end to carriage 20.

The inner end 65 of carriage 20 is in the form of a part of a circular cylinder having a vertical bore 69 coaxial thereof. The upper portion of end 65 is cross-slotted, there being one broad slot 66 and another broad slot 67, the two slots extending diametrically of end 65 and lying at 90° with respect to each other.

The thus described end portion 65 of carriage 20 is adapted accurately to receive either a pointed cylindrical center punch 70, shown in FIG. 2 or a scriber 70′ shown in FIGS. 3 and 4. The center punch 70 has a circular cylindrical shank or body portion 72 which accurately reciprocably fits within passage 69. The lower end 74 of the center punch is conical, as shown in FIG. 2, whereby the workpiece 14 may be marked by lightly tapping the upper end of the center punch.

The scriber 70′ likewise has a circular cylindrical shank 72′ which accurately reciprocably fits within the passage 69 of end portion 65 of carriage 20. The lower end 74′ of scriber 70′ is of sharpened wedge shape so that when the carriage 20 is drawn along workpiece 14 in the direction of the broad extent of end 74′ the tool 70′ scribes a line on the workpiece. In order accurately angularly to position tool 70′, a tool is provided with a head 71 in the form of a cross bar parallel to the broad extent of point 74′, head 71 being accurately received within either of slots 66 and 67. Thus the scribing tool may readily selectively be mounted on carriage 20 so as to scribe a line which extends either vertically or horizontally of the workpiece as it is shown in FIG. 1.

It is believed that the construction and manner of use of the layout device of the invention will be clear from the above description. However, the manner in which the four points shown in FIG. 1 are located on the workpiece will be briefly described. In will be assumed that the point A is located on the working drawings with reference to the left hand and bottom edges of the workpiece as it is shown in FIG. 1, and that the other three points are located by reference progressively to each previous point.

In locating point A, the toolmaker first traverses carriage 19 so that the reading on scale 30 given by the zero point on scale 32 corresponds to the distance given in the drawing from the inner edge of guide 11 and thus to such distance from the left hand edge of the workpiece. The operator then traverses carriage 20 on rail 17 to a point at which the reading on fixed scale 63 corresponds to the distance given on the drawing from the inner edge of guide 12 and thus from the lower edge of the workpiece. The center punch 70 may then be mounted on carriage 20 and the point A marked upon the workpiece. The center punch is then withdrawn from the carriage 20, the movable scale 34 is adjusted to its nearest inch position and is accurately located at such position by momentarily depressing plunger 44. The carriage 19 is then moved to the right through the horizontal distance indicated on the drawing between points A and B. To arrive at the distance through which carriage 19 must be moved, the toolmaker employs scale 34 which, after its initial positioning, remains fixed while the carriage 19 travels with respect thereto. The toolmaker merely notes the number of inches which the zero point on vernier scale 41 moves along the now fixed scale 34 and by very simple arithmetic arrives at the position of carriage 19 which corresponds to the distance given on the drawing between the points A and B.

The vertical position of point B is arrived at by a similar procedure, except that it involves the adjustment of carriage 20 along rail 17. In this portion of the operation the scale 57 is first accurately positioned with respect to carriage 20 by use of the stop plunger 62, following which carriage 20 is moved vertically along rail 17 to the required position as indicated by scale 57 and vernier 60. Here, as in the previous operation, the toolmaker arrives at the correct position on scale 57, being given the vertical distance of point B from point A, by simple subtraction. Points C and D may obviously be quickly determined in the same manner as points A and B.

It will be seen that the layout device of the invention allows points on a workpiece to be quickly and accurately determined regardless of the manner in which their position is indicated on the working drawing. The adjustable scales 34 and 57, which may be accurately positioned at the nearest inch, for example, relative to the respect carriage, eliminate the necessity for involved subtraction or addition of dimensions. At most, the toolmaker must note the number of inch divisions through which the carriages have been traversed. When he has done this, he merely sets the carriage accurately to the remaining, decimal portion, of the dimension, as indicated on the vernier scale 41 or 60, as the case may be.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. A layout device for sheet or plate workpieces, comprising a broad base board, abutments along two adjacent edges of the baseboard whereby to locate a sheet or plate to be worked upon, a first guideway on the baseboard disposed along one edge thereof, a first carriage movable along the first guideway, a cross rail secured to the carriage and adapted to move therewith along the first guideway, said cross rail at least substantially spanning the baseboard, a second guideway on the cross rail disposed longitudinally thereof, a second carriage movable along the second guideway, means on the second carriage mounting a workpiece marking tool, elongated fixed first scales mounted on the baseboard along the first guideway and on the cross rail, a first index mark on the first carriage cooperating with said first scale, and a longitudinal second scale mounted on the baseboard close to and parallel to the said first scale, said second scale being movable along the direction of its length, and a second index mark on the first carriage cooperating with said second scale, means for selectively locking the first carriage from movement along the first guideway and means for selectively locking the second carriage from movement along the cross rail, means to move the second scale along the direction of its length, and means selectively to lock the first carriage to the second scale at predetermined locations along such second scale, the first and second scales being similarly graduated in equally spaced main divisions and sub-divisions, the means for locking the second scale to the first carriage being so constructed and arranged as to lock the second scale only when the said main divisions thereof are opposite the index mark on the first carriage.

2. Apparatus as defined in claim 1, wherein the said locking means comprises a series of holes regularly spaced along the length of the second scale, and a depressable pin mounted on the first carriage and adapted selectively to be received within said holes in the second scale.

3. A layout device for sheet or plate workpieces, comprising a broad base board, abutments along two adjacent edges of the baseboard whereby to locate a sheet or plate to be worked upon, a first guideway on the baseboard disposed on one edge thereof, a first carriage movable along the first guideway, a cross rail secured to the carriage and adapted to move therewith along the first guideway, said cross rail at least substantially spanning the baseboard, a second guideway on the cross rail disposed longitudinally thereof, a second carriage movable along the second guideway, means on the second carriage mounting a workpiece marking tool, elongated fixed first scales mounted on the baseboard along the first guideway and on the cross rail, first indicia on the first and second carriages cooperating with said respective first scales, elongated second scales mounted on the baseboard and on the cross rail close to and parallel to the said first scales, said second scales being movable along the directions of their lengths, and second indicia on the first and second carriages cooperating with said respective second scales, means for selectively locking the first carriage from movement along the first guideway, means for selectively locking the second carriage from movement along the cross rail, means to move the said second scales along the directions of their lengths, and means selectively to lock the first and second carriages to the respective second scales at predetermined locations along such second scales, the first and second scales being similarly graduated in equally spaced main divisions and sub-divisions, the means for locking the second scales to the respective carriages being operative to lock the second scales only when the said main divisions thereof are opposite the respective indicia on the carriages.

4. Apparatus as defined in claim 3, wherein said locking means comprises a series of holes regularly spaced along the lengths of the second scales, and depressable pins mounted on the carriages and adapted selectively to be received within said holes in the second scales.

References Cited in the file of this patent

UNITED STATES PATENTS

| | | |
|---|---|---|
| 543,492 | Laughlin et al. | July 30, 1895 |
| 1,100,878 | Higgins et al. | June 23, 1914 |
| 1,615,668 | Anderson | Jan. 25, 1927 |
| 2,226,302 | Aswad | Dec. 24, 1940 |
| 2,618,860 | Engehart | Nov. 25, 1952 |
| 2,738,586 | Sasse | Mar. 20, 1956 |